Aug. 29, 1939.   C. F. STRONG   2,170,918
CONTROL FOR MULTIUNIT POWER GENERATING SYSTEMS
Filed Nov. 19, 1938   2 Sheets-Sheet 2
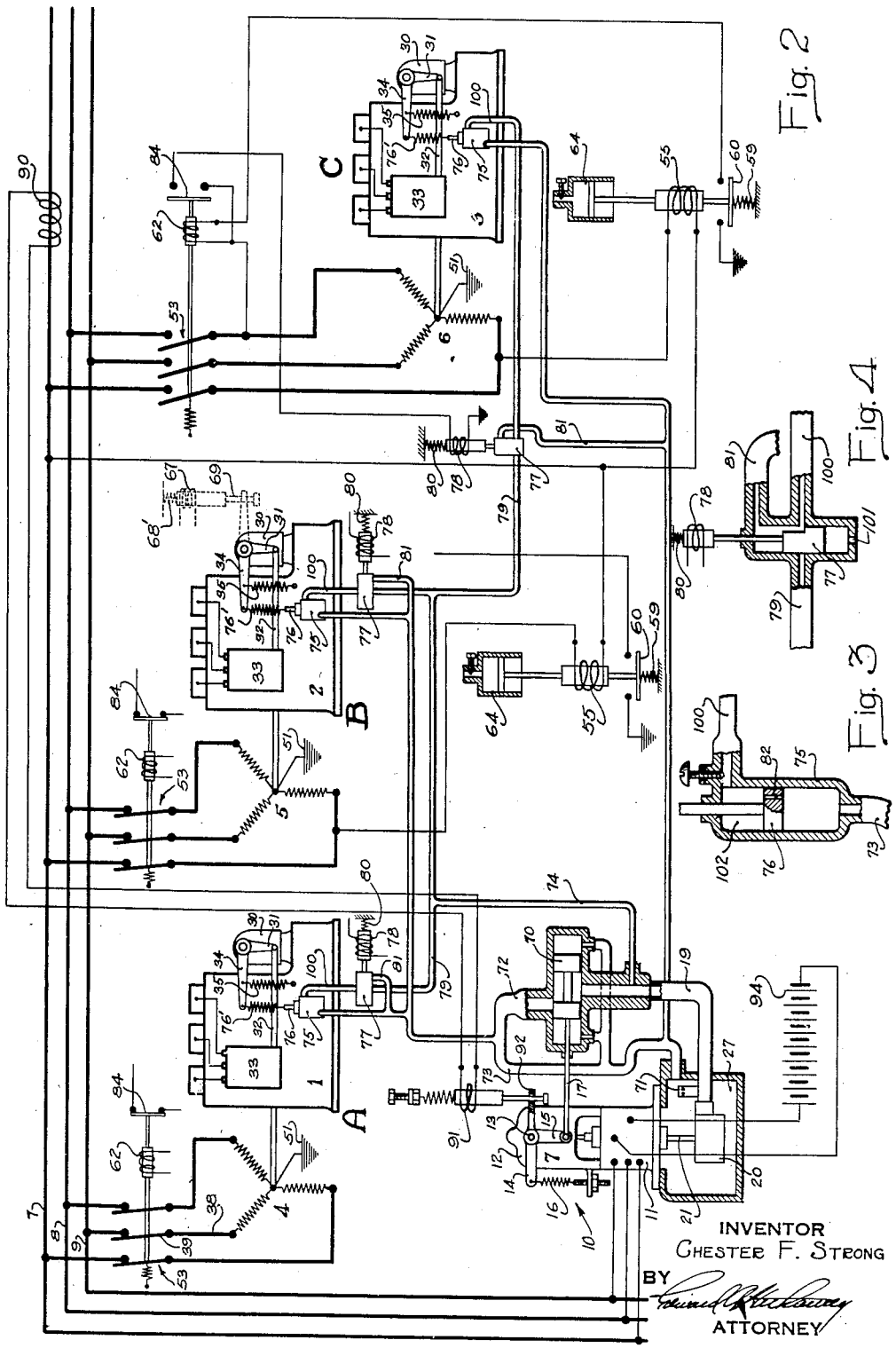
INVENTOR
CHESTER F. STRONG
BY
ATTORNEY Patented Aug. 29, 1939

2,170,918

UNITED STATES PATENT OFFICE 2,170,918

CONTROL FOR MULTIUNIT POWER GENERATING SYSTEMS

Chester F. Strong, New York, N. Y.

Application November 19, 1938, Serial No. 241,369

13 Claims. (Cl. 290—4)

This invention relates generally to power generating systems employing a plurality of prime mover operated alternating current generating units and relates more particularly to improved synchronous timing and load distributing apparatus.

It is an object of my invention to provide an improved system for maintaining a predetermined synchronous speed of the generating units driven by internal combustion engines preferably Diesel engines. A further object is to provide an improved synchronous speed control system that embodies an inherent ability to automatically control the engines so as to distribute the line load equally between the units connected to the line.

Another object is to provide an improved synchronous speed control system adapted to operate upon the usual engine speed governor in an improved manner. A further object is to provide an improved means whereby upon sudden load demand the engines may be instantly adjusted but without disturbing the operative control and load distribution by the synchronous timing system.

In the specific embodiments of the invention, each engine has a centrifugal speed governor adjusted to control the engine fuel pump so as to operate the engine at a predetermined synchronous speed under no load while a master speed controller, operated in synchronism with the line current, in turn controls means for causing individual units when connected to the main line to operate under load and to maintain synchronous speed as well as to distribute the line load between those units connected to the line.

The means for causing individual units to operate under load at synchronous speed specifically comprises mechanism for exerting a supplemental force on the individual engine governors which are only adapted to maintain synchronous speed under no load. In one embodiment the supplemental force is created by electrical solenoids and in another embodiment by hydraulic pistons and cylinders. In each case the electrical circuits for the solenoids and the hydraulic circuit for the hydraulic pistons and cylinders is controlled by a pressure pump driven from the master speed controller. The master speed controller is provided with a speed responsive hydraulic valve, which in the case of the electrical solenoids, controls a servo-motor for varying the variable resistance, and in the case of the supplemental hydraulic pistons and cylinders the speed responsive valve controls the operating pressure therefor. Hence it is seen that in one of the embodiments an electrical resistance or circuit is variably controlled in accordance with variations in line frequency (speed) and in the other modification a supplemental fluid pressure force is variably controlled in accordance with variations in line frequency. This latter modification is to be preferred, although for purposes of clarity and understanding the electrical system is first described.

Other objects and advantages will be more apparent to those skilled in the art from the following description of the accompanying drawings in which:

Fig. 2 is an outline similar to Fig. 1 but showing another form of my improved control system wherein a hydraulic circuit is used in place of an electrical circuit;

Fig. 3 is an enlarged sectional view of a piston and cylinder for operating the individual engine governors, and Fig. 4 is an enlarged sectional view of a control valve.

Figure 1:
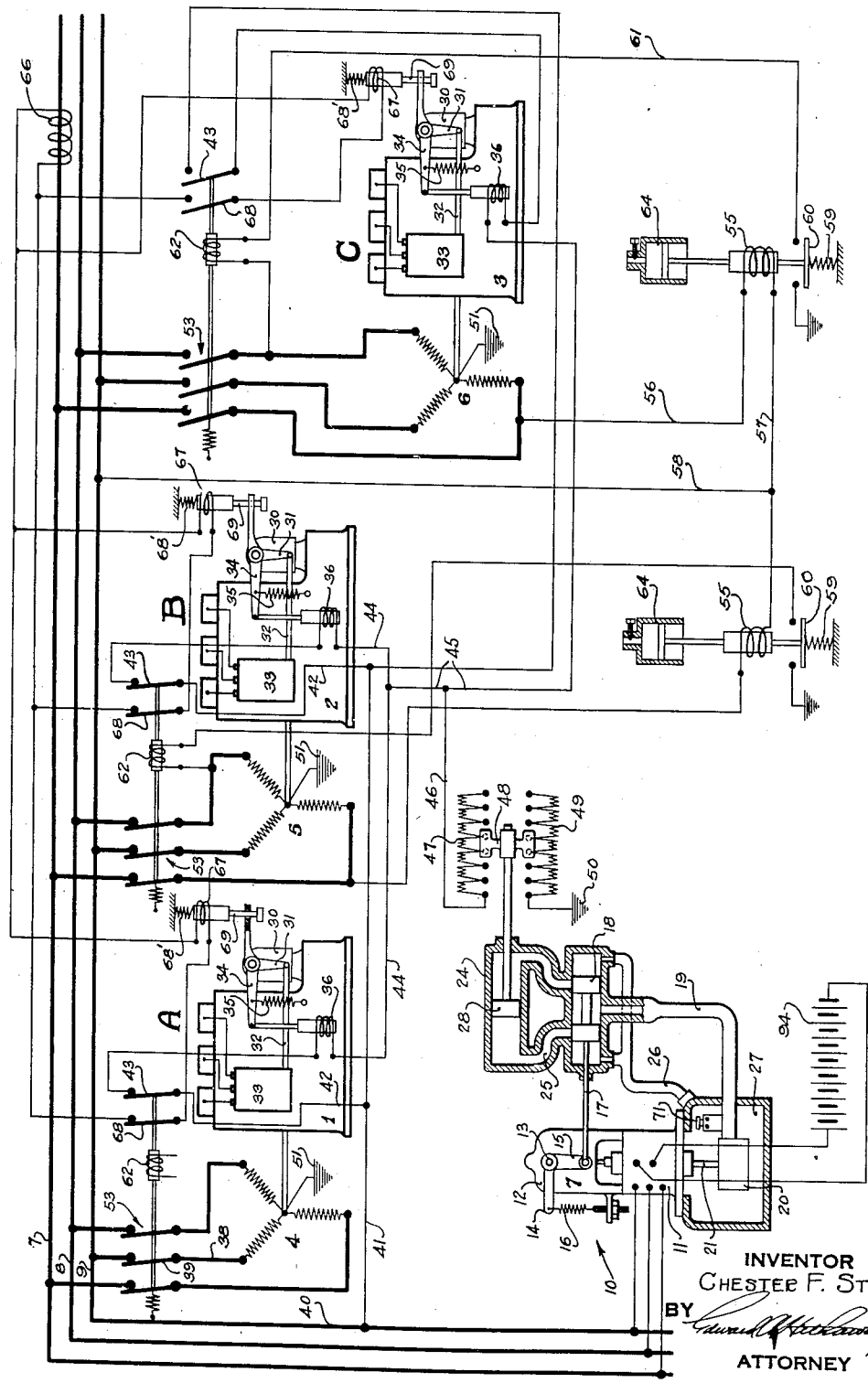
Fig. 1 is a diagrammatic outline of the electrical circuits and mechanical elements embodied in one form of my improved control system.

For purposes of illustration there is shown herein a plurality, specifically three, generating units A, B and C. These units have respectively internal combustion motors 1, 2 and 3, preferably Diesel engines or other prime movers that are responsive to governor control, driving alternating current generators diagrammatically indicated at 4, 5 and 6. Unit A is normally connected to a main line 7, 8 and 9 to provide a continuous source of current therefor. In order to simplify the description of the overall operation, unit B is also shown as connected to the main line, although it will be understood that unit B would normally be brought on to or taken off of the main line in accordance with the load demand in the same manner as for unit C. Any or all of the units may be started or stopped automatically or manually in accordance with the load demand under the control of well-known automatic equipment but which it is not necessary to describe or disclose inasmuch as the present invention relates particularly to an improved means for establishing and maintaining a synchronous speed of any units on load and also relates to an improved combination of such speed control with synchronizing means for connecting the respective units to the line. Hence it will suffice to describe only the synchronous speed control and synchronizing system in conjunction with the engine governors or their control elements necessary for the speed and synchronizing operations.

A master synchronous speed controller per se generally indicated at 10 comprises any usual and well-known centrifugal type speed governor having a synchronous motor 11 for driving a usual centrifugal head diagrammatically indicated at 12. This operates a usual governor rock shaft 13 to which bell crank arms 14 and 15 are secured. A tension spring 16 is connected to arm 14 while arm 15 is connected by a valve stem 17 to a hydraulic distributing valve 18. Fluid pressure is supplied to valve 18 through a pipe 19 from a suitable oil pump 20 which is driven directly from shaft 21 of synchronous motor 11. The synchronous motor 11 is connected to main lines 7, 8 and 9 and hence operates at the same speed. When the line frequency drops, the speed of motor 11 and centrifugal governor 12 also drops to cause valve 18 to move to the right and admit pump pressure fluid from pipe 19 to the right end of a servo-motor cylinder 24 and simultaneously exhaust the left end of said cylinder through a port 25 and passage 26 to the pump sump 27. An increase in frequency causes valve 18 to move to the left to reversely connect the cylinder ends to the supply and exhaust. Hence the servo-motor piston 28 moves to the right upon a decrease in speed, and moves to the left upon an increase in speed.

First considering the effect of a speed variation upon units already connected to the line, it will be first noted that each engine, such for example as 1, has its own centrifugal type speed governor diagrammatically indicated at 30 whose governor arm 31 is connected by a link 32 to any suitable conventional Diesel engine fuel pump diagrammatically indicated at 33. Governor arm 31 also has rigidly secured thereto a bell crank arm 34. A tension spring 35, for biasing governor arms 31 and 34 in a counterclockwise direction, is adjusted so as to normally maintain the engine at substantially synchronous speed when operating without load. To maintain the synchronous speed of the engine when load comes on, a solenoid 36 has its core connected to governor arm 34 whereby energization of the solenoid 36 pulls down on arm 34 to supplement the action of tension spring 35. Accordingly governor arm 31 moves fuel pump link 32 to the right to increase fuel supply to the engine cylinder in a manner well understood in the art. Solenoid 36 is supplied with current from generator 4 through wire 38, switch 39, main line wire 9, wires 40, 41 and 42, across switch 43 to solenoid 36 and thence through wires 44, 45 and 46 to a resistance 47 and thence across a slider 48, connected to servomotor piston 28, to a second resistance 49 and ground 50 and thence to the generator ground 51 to complete the circuit.

Operation of the master synchronous controller 10 causes slider 48 to move to the left upon a drop in line frequency (speed) thereby reducing the amount of resistance of resistors 47 and 49 with consequent increase of current flow through solenoid 36 which thereupon increases the downpull on governor arm 34 to move arm 31 and fuel pump link 32 in a counterclockwise direction for increasing the power output of the engine. Conversely, when the line load drops, with an accompanying increase in frequency or speed, the slider 48 moves to the right thereby increasing the amount of resistance through 47 and 49 to accordingly decrease the current for solenoid 36. The decreased solenoid force allows the continuously acting contrary centrifugal governor force to move fuel pump link 32 so as to decrease the power input of engine 1. It will be understood that so long as the frequency is below the desired value, then valve 18 will be displaced to the right and consequently piston 28 will move continuously toward the left until the current flow through solenoid 36 is sufficiently increased to cause engine 1 to generate sufficient power for re-establishing the line frequency to the desired value. When this desired frequency is obtained, then valve 18 is returned to neutral and movement of piston 28 ceases. Conversely, when the line load decreases so that the frequency or speed increases, then valve 18 is displaced to the left so as to cause piston 28 to move continuously to the right until current for solenoid 36 has been decreased sufficiently until the engine speed has been restored to normal through adjustment of its fuel supply. Thereupon movement of the piston 28 ceases.

The foregoing description covers synchronous control of one unit such as unit A. Assuming that the second unit B has been brought on to the line (in a manner similar to that to be described shortly for unit C) so that its generator 5 is connected to the main line through a main switch 53, then the governor control for unit B will operate identically to the governor control of unit A heretofore described. Hence, similar governor and control parts for units A and B, and also for unit C, are given the same reference numbers. One side of solenoid 36 of unit B is connected to wire 41 and its other side to wire 45 leading to resistances 47 and 49. Thus solenoid 36 of units A and B are now connected in parallel so that they are both responsive to the operation of resistance slide 48. When unit B is thrown on to the line so that its solenoid 36 becomes connected in parallel with solenoid 36 of unit A, the current for these two solenoids will become equally divided between the same. Hence, assuming that unit A was carrying full load when operating alone and that unit B is now brought on to the line when operating at no load, it is seen that the current for solenoid 36 of unit A will be reduced by one-half thereby effecting a corresponding reduction of the power output of unit A. The other one-half quantity of solenoid current will now be carried through solenoid 36 of unit B so as to increase the power output of unit B. Hence, the two units will carry equal loads and be subject to synchronous control from the master controller 10. The same mode of operation and results thereof take place when unit C is brought on to the line for here again solenoid 36 of unit C will be in parallel with the solenoids 36 of units A and B. The accuracy of the synchronous operation is premised on the fundamental theory that each governor spring 35 is so adjusted that the individual governors will operate their respective engines at substantially synchronous speed at no load.

The apparatus for connecting each unit to the line when a unit reaches synchronous speed is disclosed more fully in my copending application Serial No. 237,495, filed October 28, 1938. Hence, it will suffice to describe briefly such synchronizing operation in connection with unit C hereof. When engine 3 of this unit comes up to speed and before it is connected to the line governor 30 will hold the unit at synchronous speed. During such operation solenoid 36 of unit C is disconnected by reason of switch 43 of unit C being open. A synchronizing relay 55 is connected at one of its sides by wire 56 to one phase of generator 6 and thence to its ground 51. The other side of relay 55 is connected by wires 57 and 58 to main wire 9 and thence to generator 4 of unit A by way of wire 38 and ground 51 of generator 4, the circuit being completed to the ground connection 51 of generator 6. So long as generator 6 is out of step with the main line, then current will flow through synchronous solenoid 55 to hold its core downwardly against a compression spring 59. When generator 6 is in step with the main line current then no current, or relatively little current, flows through relay 55 and accordingly compression spring 59 can move solenoid core upwardly together with a switch 60 which closes a circuit 61. This circuit energizes a main switch solenoid 62 which thereupon closes main switch 53 of unit C and also closes switch 43 of unit C for placing its solenoid 36 in parallel with the corresponding solenoids of units A and B. As described in my said copending application, switch 60 is prevented from closing in the event that generating unit C does not have a stable synchronous speed. For example, if the generating unit C should momentarily operate at synchronous speed, a dashpot 64 will retard closure of switch 60 for sufficient period to allow the momentary condition to pass by. However, if the synchronous speed continues sufficiently long to indicate a stable operation then by that time a usual vent in dashpot 64 allows spring 59 to close switch 60, thereby to bring unit C on to the main line. Unit B is also shown with a similar synchronizing apparatus and inasmuch as it is identical to that of unit C, description thereof is not necessary.

*Severe load demand control.*—When a heavy load is suddenly placed on main lines 7, 8 and 9, it is desirable to adjust the fuel pumps quickly rather than wait for the action of the centrifugal governors. To accomplish this desirable result, I provide a current transformer 66 in the main line and connect this transformer in parallel with one side of a plurality of solenoids 67, one for each unit, the other side of the transformer being connected through switches 68 (associated with switches 43 of each unit) to the other side of the solenoids. The core of solenoid 67 is normally biased downwardly by a compression spring 68 and is provided with a stem 69 extending through a suitable opening in an extension of lever 34. A collar is provided on stem 69 to engage the under side of such extension. When a sudden load comes on to the line, transformer 66 will generate current for solenoids 67 of those units connected to the line and thereby raise the solenoid cores and rotate governor levers 34 in a counterclockwise direction to adjust fuel pump link 32 and accordingly increase the power output of each unit connected to the line. This quick action of the governors is only momentary and is disconnected as soon as the load goes back to normal whereupon compression springs 68' force solenoid stems 69 downwardly out of engagement with governor levers 34 whereupon the governors operate in their usual manner heretofore described.

*Figure 2 arrangement.*—This arrangement is similar in its operation to that of Fig. 1 except that oil pressure is used for controlling the engine governors instead of the solenoids 36. Hence, it will suffice to describe Fig. 2 only so far as it differs from Fig. 1. Because of the similarity of a great many elements and their operation, corresponding parts of Figs. 1 and 2 are given the same reference characters. In Fig. 2 the governor link 17 operates a valve 70 so as to throttle the oil pressure in passage 19 from pump 20. A relief valve 71 prevents excess pump pressure. As valve 70 moves across an outlet 72, it throttles the return of oil through a line 73 to the pump sump 27. Accordingly, pump pressure builds up in passages 19 and 74 to cause pressure in the upper end of a cylinder 75 to move a piston 76 therein downwardly, Fig. 3. This piston is connected to governor arm 34 through a spring 76 thereby supplementing the downward pull of the no load governor spring 35. When the pressure in the upper end of cylinder 75 decreases, the supplemental force of spring 76 is lessened, or completely eliminated in the event of no load operation. The supply of pump fluid to cylinder 75 is controlled by a valve 77 which is operated by a solenoid 78. This valve is interposed in fluid line 79 connected to pump line 74. As shown in Fig. 4, when solenoid 78 is deenergized valve 77 is moved by a spring 80 to its closed position whereby fluid from line 79 is cut off from line 100 and any fluid in said line 100 is bypassed to line 81 so as to relieve any tension on auxiliary spring 76' in engine governor. A small opening 101 in lower part of valve 75 is provided for allowing any leakage past valve 77 to escape and if desired may be connected to oil return line 81. This hole must be sufficiently small so as not to materially affect pressure in line 79 when solenoid 78 is energized and valve 77 is raised allowing oil pressure from line 79 to be transmitted to line 100 and thence to pressure chamber 102 of oil pressure cylinder 75. However, when valve 77 is closed, as shown in Fig. 4, fluid is thus prevented from flowing to cylinder 75. Any oil that may have accumulated in the upper end of cylinder 75 is returned to pipe 73 through a small drain orifice 82 and thence through the bottom of cylinder 75 to pipe 73.

The electrical connections for solenoids 78 of units A and B, Fig. 2, have not been shown inasmuch as they are the same as the connections for solenoid 78 of unit C which are shown for purposes of general illustration.

The vertical position of valve 77 as shown in Fig. 4 corresponds to the position of this valve for unit C, Fig. 2. The valves 77 for the other units A and B are shown in a horizontal position but are otherwise identical to Fig. 4.

*Operation of Figure 2.*—Assume that units A and B are connected to the line and carrying line load and that unit C is started and brought up to synchronous speed under no load. When unit C reaches synchronous speed, its synchronizing relay 55 will cause main switch 53 of unit C to close when the generator is in phase with the main line. Simultaneously, a switch 84 will be closed, thereby establishing a circuit for solenoid 78. Energization of solenoid 78 opens its valve 77 to allow oil pressure from line 74 to be supplied to pressure cylinder 75 of unit C. The pressure in the cylinder 75 of each of the units will become equalized and accordingly cause each unit to assume an equal share of the load and also to remain at synchronous speed as controlled by the master speed governing device 7.

When a new unit such as C is brought on to the line in the Fig. 2 arrangement, the oil pressure initially operating on piston 76 of unit C will cause this unit to create a momentary excess of generating capacity with a consequent increase in the line frequency. This will cause speed controller 10 to move valve 70 to the left and accordingly reduce the pump pressure in line 74. This reduced pressure will allow the pistons 76 for each unit to move upwardly and thereby reduce the load generated by each unit. The fluid pressure acting on each of the pistons 76 will ultimately become equalized so that each piston assumes an identical position and accordingly exerts the same supplemental force on the governor springs of the respective units. Inasmuch as the governors are initially set for synchronous operation under no load, it is seen that with identical supplemental forces acting on the governor control levers 34, they will cause each unit to generate equal power. Conversely, when a unit is taken off of the line, the fluid pressure for cylinders 75 will not be sufficient to increase the fuel adjustment of the engines remaining on load in order for these remaining engines to take up such load as the disconnected engine was carrying. Accordingly, the line frequency will tend to drop thereby resulting in the master controller 10 moving valve 70 so as to increase pump pressure and thereby move pistons 76 downwardly. This will increase the fuel adjustment for each of the engines remaining on load and the equalizing of the pump pressure in the cylinders will insure equal power generation.

If desired, a current transformer 90 may be inserted in the main line to energize a solenoid 91 upon occurrence of a sudden load demand for the same general purpose served by current transformer 66 of Fig. 1. However, in Fig. 2, the current transformer is connected to solenoid 91 whose core is connected to an extension 92 of the governor arm 14 forming part of the master speed control 10. Energization of solenoid 91 will rotate governor arm 14 in a counterclockwise direction to move valve 70 to the right and thus restrict flow of fluid through passage 72 and accordingly increase the pump pressure in pipe 74. This will move the pistons 76 downwardly to effect a quick fuel adjustment of each engine without waiting for the action of the centrifugal governors.

In both arrangements of Figs. 1 and 2, the exciting fields for generators 4, 5 and 6 have been omitted for purposes of simplicity inasmuch as the elements are well-known in the art. Also, it will be understood that any suitable source of excitation for the synchronous motor 11 may be employed such as a storage battery 94.

From the foregoing disclosure of the two modifications, it is seen that I have provided an improved hydraulic timing and synchronizing control system that is especially applicable to a generating system having a plurality of units of preferably moderate power capacity thereby rendering such a system suitable for apartment houses, office buildings and similar users of electric current. The timing and synchronizing control is relatively simple, compact and fool-proof thereby making it very well adapted for generating systems employing automatic starting and stopping of a plurality of engines in accordance with load demand.

It will of course be understood that various changes in details of construction and arrangement of parts may be made by those skilled in the art without departing from the spirit of the invention as set forth in the appended claims.

I claim:

1. A power generating system comprising, in combination, a plurality of engine driven alternating current generating units, electrical means for connecting an incoming unit to a main load line, means for controlling each engine individually so that at no load they operate at a predetermined synchronous speed, a master speed controller operated in synchronism with the line current, and supplemental force producing means controlled by said master controller for causing each individual unit when connected to the main line to operate under load at synchronous speed.

2. A power generating system comprising, in combination, a plurality of engine driven alternating current generating units, electrical means for connecting an incoming unit to a main load line, means for controlling each engine individually so that at no load they operate at a predetermined synchronous speed, a master speed contoller operated in synchronism with the line current, and supplemental force producing means controlled by said master controller for causing each individual unit when connected to the main line to operate under load at synchronous speed, said means for controlling each engine individually at synchronous speed no load including for each engine a fuel pump and a speed responsive governor for controlling the same.

3. A power generating system comprising, in combination, a plurality of engine driven alternating current generating units, electrical means for connecting an incoming unit to a main load line, means for controlling each engine individually so that at no load they operate at a predetermined synchronous speed, a master speed controller operated in synchronism with the line current, and supplemental force producing means controlled by said master controller for causing each individual unit when connected to the main line to operate under load at synchronous speed, said means for controlling each engine individually at synchronous speed no load including for each engine a fuel pump and a speed responsive governor for controlling the same, and said supplemental means having an operative connection with each individual fuel pump so that an incoming unit when connected to the line is changed from synchronous speed no load to synchronous speed under load.

4. The combination set forth in claim 1 further characterized in that said supplemental means has provision for automatically adjusting the power output of an incoming engine when connected to the line so as to maintain synchronous speed under load and to distribute line load equally between the units on load.

5. A power generating system comprising, in combination, a plurality of engine driven alternating current generating units, electrical means for connecting an incoming unit to a main load line, means for controlling each engine individually so that at not load they operate at a predetermined synchronous speed, a master speed controller operated in synchronism with the line current, and supplemental force producing means controlled by said master controller for causing each individual unit when connected to the main line to operate under load at synchronous speed, said master speed controller including a speed responsive valve and a fluid pressure pump, and said supplemental means including fluid means operated by pressure from said pump under the control of said speed responsive valve.

6. A power generating system comprising, in combination, a plurality of engine driven alternating current generating units, electrical means for connecting an incoming unit to a main load line, means for controlling each engine individually so that at no load they operate at a predetermined synchronous speed, a master speed controller operated in synchronism with the line current, and supplemental force producing means controlled by said master controller for causing each individual unit when connected to the main line to operate under load at synchronous speed, said master speed controller including a speed responsive valve and a fluid pressure pump, and said supplemental means including for each individual engine a fluid pressure piston and cylinder operated by pressure fluid from said pump.

7. The combination set forth in claim 1 further characterized in that the master speed controller includes a speed responsive valve and a fluid pressure pump, and said supplemental means includes for each individual engine a fluid pressure piston and cylinder operated by pressure fluid from said pump and a hydraulic circuit interconnecting said individual cylinders thereby to effect load distribution between units on load.

8. A power generating system comprising, in combination, a plurality of engine driven alternating current generating units, electrical means for connecting an incoming unit to a main load line, means for controlling each engine individually so that at no load they operate at a predetermined synchronous speed, a master speed controller operated in synchronism with the line current, and supplemental force producing means controlled by said master controller for causing each individual unit when connected to the main line to operate under load at synchronous speed, said master speed controller including a fluid pressure pump and a speed responsive valve for varying the pressure of said pump automatically in accordance with variations in line frequency from a predetermined value, and said supplemental means including for each individual engine a cylinder and piston which is moved in accordance with the pump pressure.

9. The combination set forth in claim 1 further characterized in that said supplemental means includes, for each individual incoming unit, a solenoid for effecting the supplemental force, an electrical circuit for the solenoids and a variable resistance in said circuit for varying the solenoid current and said master controller has an operative connection with said resistance to vary the same in accordance with variations in line frequency thereby to control the speed of the units on load so as to maintain a predetermined synchronous speed.

10. The combination set forth in claim 1 further characterized in that said supplemental means includes, for each individual incoming engine, a solenoid for controlling the supplemental force, an electrical circuit for the solenoids and a variable resistance in said circuit for varying the solenoid current, said master controller has an operative connection with said resistance to vary the same in accordance with variations in line frequency thereby to control the speed of the units on load so as to maintain a predetermined synchronous speed, the circuit for said solenoids having interconnections between each solenoid of the units on load so as to be commonly controlled by the master speed controller.

11. The combination set forth in claim 1 further characterized by the provision of means responsive to line load current for effecting a momentary adjustment of the power output of the engines on load independently of the responsiveness of the master speed controller to variations in line frequency.

12. The combination set forth in claim 1 further characterized in that said electrical means includes means for automatically connecting an incoming unit to the line when the generated current of the incoming unit is in step with the line current.

13. The combination set forth in claim 1 further characterized in that said electrical means includes leads from the generating units to the main line and a switch in said leads for connecting or disconnecting a generated unit to the line.

CHESTER F. STRONG.